(12) United States Patent
Shi (10) Patent No.: US 11,702,190 B2
(45) Date of Patent: Jul. 18, 2023

(54) DOUBLE-RING ROTARY WING SPHERICAL CABIN AIRCRAFT

(71) Applicant: Zhiyong Shi, Zhejiang (CN)

(72) Inventor: Zhiyong Shi, Zhejiang (CN)

(73) Assignee: Zhejiang AFO Aviation Science & Technology Co., Ltd., Hangzhou (CN)

( * ) Notice: Subject to any disclaimer, the term of this patent is extended or adjusted under 35 U.S.C. 154(b) by 421 days.

(21) Appl. No.: 17/006,411

(22) Filed: Aug. 28, 2020

(65) Prior Publication Data

US 2020/0391848 A1    Dec. 17, 2020

Related U.S. Application Data

(63) Continuation of application No. PCT/CN2019/075744, filed on Feb. 21, 2019.

(30) Foreign Application Priority Data

Jun. 6, 2018   (CN) .......................... 201820900078.2
Feb. 1, 2019   (CN) .......................... 201910104961.X (51) Int. Cl.
*B64C 11/48*   (2006.01)
*B64C 27/10*   (2023.01)
(Continued)

(52) U.S. Cl.
CPC .............. *B64C 11/48* (2013.01); *B64C 27/10* (2013.01); *B64C 27/20* (2013.01); *B64C 39/062* (2013.01); *B64D 27/24* (2013.01)

(58) Field of Classification Search
CPC combination set(s) only.
See application file for complete search history.

(56) References Cited

U.S. PATENT DOCUMENTS 3,067,967 A * 12/1962 Barr ..................... B64C 39/001
                                                    180/129
3,633,849 A *  1/1972 Kling .................... B64C 27/20
                                                    244/23 C (Continued)

FOREIGN PATENT DOCUMENTS

| CN | 102602538 A | 7/2012 |
| CN | 105835640 A | 8/2016 |

(Continued)

*Primary Examiner* — Binh Q Tran (57) ABSTRACT

A double-ring rotary wing spherical cabin aircraft includes a spherical cabin; an upper protective cover; a lower protective cover; a rotary wing fixing ring connected between inner circles of the upper and lower protective covers, and mounted with a gyroscope and a rotatable attitude-adjusting ring; an upper rotary wing rotor and a lower rotary wing rotor rotationally mounted on the rotary wing fixing ring; and a control system. The spherical cabin is rotationally mounted in the attitude-adjusting ring. Two attitude-adjusting articulated shafts opposite to each other are connected between the attitude-adjusting ring and the rotary wing fixing ring. Two cabin articulated shafts opposite to each other are connected between the spherical cabin and the attitude-adjusting ring. The attitude-adjusting articulated shaft and the cabin articulated shaft are in transmission connection with an attitude-adjusting motor. The attitude-adjusting motor and the gyroscope are electrically connected to the control system.

9 Claims, 6 Drawing Sheets

(51) Int. Cl.
  *B64C 27/20* (2023.01)
  *B64C 39/06* (2006.01)
  *B64D 27/24* (2006.01)

(56) References Cited

U.S. PATENT DOCUMENTS

| | | | |
|---|---|---|---|
| 4,214,720 A | 7/1980 | Desautel | |
| 5,653,404 A * | 8/1997 | Ploshkin | B63G 8/08 244/73 C |
| 6,371,406 B1 * | 4/2002 | Corcoran | B64D 27/20 244/23 C |
| 2006/0049304 A1 * | 3/2006 | Sanders | B64C 39/024 244/23 A |
| 2013/0306802 A1 * | 11/2013 | Hayden, III | B64C 29/00 244/23 C |
| 2017/0341725 A1 * | 11/2017 | Skahan | B64C 13/044 |
| 2017/0361930 A1 | 12/2017 | Choi | |
| 2019/0193855 A1 * | 6/2019 | Prager | B64D 1/10 |

FOREIGN PATENT DOCUMENTS

| | | |
|---|---|---|
| CN | 105984586 A | 10/2016 |
| CN | 106477042 A | 3/2017 |
| CN | 206087305 U | 4/2017 |
| CN | 206634210 U | 11/2017 |
| CN | 107539480 A | 1/2018 |
| CN | 108190008 A | 6/2018 |

* cited by examiner

DOUBLE-RING ROTARY WING SPHERICAL CABIN AIRCRAFT

CROSS-REFERENCE TO RELATED APPLICATIONS

This application is a continuation of International Application No. PCT/CN2019/075744, filed on Feb. 21, 2019, which claims the benefit of priority from Chinese Patent Application No. 201820296685.2 filed on Feb. 28, 2018, No. 201820900078.2 filed on Jun. 6, 2018, and No. 201910104961.X filed on Feb. 1, 2019. The content of the aforementioned applications, including any intervening amendments thereto, is incorporated herein by reference.

TECHNICAL FIELD

The present disclosure relates to an aircraft and particularly relates to a double-ring rotary wing spherical cabin aircraft.

BACKGROUND OF THE PRESENT INVENTION

As general aviation is determined as a pillar industry in China, more and more attentions have been paid to the aircraft. Fixed wing aircraft needs runways; ordinary helicopters have exposed rotary wings and are low in safety; further, high-power engines need to be equipped due to high load torques; drive systems are complicated, and fatigue of the parts is easily caused, so that the parts should be periodically replaced; and maintenance cost of the aircraft is high. The development of the general aviation is greatly limited by the above factors. At present, unmanned aerial vehicles are developed quickly and are used for photographing or even delivering express. However, rotary wing blades of many existing unmanned aerial vehicles are exposed. Risk of collision or breakage exists. The unmanned aerial vehicles are inconvenient in attitude adjustment and cannot realize high loading capacity.

SUMMARY OF THE PRESENT INVENTION

The present invention overcomes the defects that rotary wing blades of the aircraft are exposed, the risk of collision or breakage exists and the aircraft is inconvenient in attitude adjustment, and provides a double-ring rotary wing spherical cabin aircraft. The rotary wing blades of the aircraft are hidden in a protective cover, and the aircraft is not collided or broken during rotation. Moreover, the rotary wing blades are short, which is beneficial for the reduction of harsh strength requirements for the rotary wing blades without the need for frequently replacing the rotary wing blades. The aircraft is convenient and reliable in attitude adjustment during flight. The double-ring rotary wing spherical cabin aircraft greatly simplifies a transmission structure, lightens the weight, decreases maintenance strength and cost, increases a power output radius, reduces requirements for engine power, greatly decreases energy consumption, has no need of empennage, and has a simple and optimized structure.

In order to solve the above problems, the present invention adopts the following technical solutions: a double-ring rotary wing spherical cabin aircraft includes a spherical cabin, an upper protective cover, a lower protective cover, a rotary wing fixing ring, an upper rotary wing rotor, a lower rotary wing rotor and a control system; the upper protective cover, the lower protective cover, the upper rotary wing rotor and the lower rotary wing rotor are all circular; ventilating grills are arranged on the upper protective cover and the lower protective cover; outer circles of the upper protective cover and the lower protective cover are connected together; the rotary wing fixing ring is connected between inner circles of the upper protective cover and the lower protective cover; an attitude-adjusting ring is rotationally mounted on the rotary wing fixing ring; the spherical cabin is rotationally mounted in the attitude-adjusting ring; two attitude-adjusting articulated shafts opposite to each other are connected between the attitude-adjusting ring and the rotary wing fixing ring; two cabin articulated shafts opposite to each other are connected between the spherical cabin and the attitude-adjusting ring; axes of the attitude-adjusting articulated shafts are perpendicular to the axes of the cabin articulated shafts; one of the attitude-adjusting articulated shafts and one of the cabin articulated shafts are in transmission connection with attitude-adjusting motors; each of the upper rotary wing rotor and the lower rotary wing rotor includes a moving ring, a strong magnetic rotor, and a plurality of rotary wing blades connected to the moving ring in uniform distribution; excitation coil stators are correspondingly mounted on the rotary wing fixing ring and the strong magnetic rotor; the moving ring is rotationally mounted on the rotary wing fixing ring; a gyroscope is mounted on the rotary wing fixing ring; and the attitude-adjusting motor, the excitation coil stators and the gyroscope are all electrically connected with the control system.

The excitation coil stators and the strong magnetic rotor form a brushless direct current motor. During operation of the double-ring rotary wing spherical cabin aircraft, the excitation coil stators are electrified by the control system, and the strong magnetic rotor drives the moving ring to rotate together. Rotation directions of the upper rotary wing rotor and the lower rotary wing rotor are always opposite, and reaction torques produced by air offset with each other. When the rotation speed of one rotary wing rotor is changed, a direction of the aircraft may be changed. The center of the spherical cabin is close to a lower position, and the lower end of the spherical cabin is lower than the lower protective cover. Through the arrangement of a pair of attitude-adjusting articulated shafts and a pair of cabin articulated shafts, the spherical cabin and the rotary wing fixing ring can rotate at any angle. Operations of the two attitude-adjusting motors are controlled by the control system so as to rotate the attitude-adjusting articulated shafts and the cabin articulated shafts. Since a gravity center of the spherical cabin is always vertically downward, the rotary wing fixing ring forms a certain dip angle relative to the spherical cabin due to rotation of the attitude-adjusting articulated shafts and the cabin articulated shafts. The aircraft may obtain thrust in a horizontal direction, so that the aircraft can fly towards the dip angle direction. The gyroscope transmits detected dip angle signals and direction signals to the control system; and the control system issues instructions to the two attitude-adjusting motors according to the signals transmitted by the gyroscope so as to control rotation speeds and rotation angles of the attitude-adjusting motors. Both the upper rotary wing rotor and the lower rotary wing rotor are arranged between the upper protective cover and the lower protective cover. The rotary wing blades are hidden and may be not collided or broken during rotation. The upper rotary wing rotor and the lower rotary wing rotor are circular, and propeller blades are short, thereby facilitating reduction of harsh strength requirements for the propeller blades. The propeller blades of the double-ring rotary wing spherical cabin aircraft are hidden in the protective covers and will not be collided or broken during rotation. Moreover, the propeller blades are short and facilitate reduction of harsh strength requirements for the propeller blades, and the aircraft is convenient and reliable in attitude adjustment in the flight.

Preferably, two circular mounting grooves are formed in the rotary wing fixing ring; suspension rings are arranged on the moving rings; adsorption rings are mounted on inner walls of the suspension rings; suspension gaps are formed among the suspension rings, the adsorption rings and side walls of the mounting grooves; movable permanent magnet rings are mounted on upper and lower surfaces of the suspension rings; fixed permanent magnet rings are mounted on the side walls of the mounting grooves and at corresponding positions of the movable permanent magnet rings; opposite sides of the movable permanent magnet rings and the fixed permanent magnet rings have the same magnetic pole; a plurality of electromagnetic blocks are uniformly distributed and mounted on the rotary wing fixing ring; the electromagnetic blocks radially face the adsorption rings and may be electrified to attract the adsorption rings; displacement sensors that radially face the adsorption rings are mounted at positions of the rotary wing fixing ring close to the electromagnetic blocks; and the electromagnetic blocks and the displacement sensors are electrically connected with the control system.

The opposite sides of the movable permanent magnet rings and the fixed permanent magnet rings are in homopolar repulsion, so that the suspension rings are in a suspended state. Gaps are always maintained between the adsorption rings and the side walls of the mounting grooves, thus the moving ring is always kept in a suspended state during rotation. Electromagnetic block coils are electrified by the control system to enable the electromagnetic blocks to attract the adsorption rings; the displacement sensors transmit the detected signals to the control system; and the control system controls electrification of the electromagnetic block coils and electrification current according to the read signals of the displacement sensors. When the electromagnetic blocks are on or off in a staggered manner, electromagnetic blocks at maximum distance positions between the detected displacement sensors and the inner walls of the adsorption rings are electrified in the same period of time, so that the adsorption rings are attracted by the electromagnetic blocks, and the distances between the displacement sensors and the inner walls of the adsorption rings are shortened. The control system reads the signals of the displacement sensors and sets an electrification frequency of a single electromagnetic block according to needs, thus the suspension rings are always in dynamic equilibrium. When the upper rotary wing rotor and the lower rotary wing rotor rotate, the moving ring is always in a suspended state; vibration and noise are small; lubrication is not needed; mechanical wear is avoided; service life is long; and maintenance cost is low.

Preferably, protector rings are arranged on the upper surfaces of the moving rings; a plurality of anti-collision bearings are uniformly distributed and mounted on the outer wall of the rotary wing fixing ring; anti-collision gaps are formed between outer walls of the anti-collision bearings and inner walls of the protector rings; and a radial spacing of the anti-collision gaps is smaller than a radial spacing between the inner walls of the adsorption rings and the side walls of the mounting grooves.

When the electromagnetic blocks fail, slight offset of the moving ring occurs in a radial direction during rotation; the inner walls of the protector rings are supported by the anti-collision bearings; and the rotary wing rotor is prevented from generating larger deviation in the radial direction during rotation; and the moving ring may normally run even if the electromagnetic blocks fail.

As another solution, a rotating bearing is mounted between the rotary wing fixing ring and the moving ring. The rotary wing fixing ring and the moving ring are rotationally connected by the rotating bearing, and the moving ring is stable and reliable in operation.

Preferably, the control system is powered by a storage battery, and both the storage battery and the control system are mounted in the spherical cabin. The storage battery supplies the power, which is environment-friendly.

Preferably, the lower end of the rotary wing fixing ring is connected with a plurality of landing gears distributed uniformly. Through the arrangement of the landing gears, the aircraft is convenient to take off and land.

Preferably, a convex positioning ring is arranged at a position of the upper surface of the lower protective cover close to an outer edge; a closure ring is arranged on the outer edge of the lower surface of the upper protective cover; the convex positioning ring and the closure ring are adaptively inserted together; and the lower end of the closure ring is supported on the upper surface of the lower protective cover. By virtue of adaptive insertion of the closure ring and the convex positioning ring, the upper protective cover and the lower protective cover are stably and reliably connected.

Preferably, the strong magnetic rotor includes a rotor ring and permanent magnetic shoes; a plurality of connecting troughs are uniformly distributed on the rotor ring; one permanent magnetic shoe is mounted in each connecting trough; and inner surfaces of two adjacent permanent magnetic shoes have opposite magnetisms. The excitation coil stators include stator rings and a plurality of excitation coils; each of the permanent magnetic shoes corresponds to one excitation coil; the excitation coils are mounted on the stator rings; a plurality of Hall sensors are mounted on the stator rings and radially face the permanent magnetic shoes; and the Hall sensors and the excitation coils are electrically connected with the control system. The brushless direct current motor formed by the structural configuration is stable and reliable in operation.

Compared with the prior art, the present invention has beneficial effects as follows: (1) the propeller blades of the double-ring rotary wing spherical cabin aircraft are hidden in the protective cover, and the aircraft is not collided or broken during rotation; moreover, the propeller blades are short, which is beneficial for the reduction of harsh strength requirements for the propeller blades without the need for frequently replacing the rotary wing blades; and the aircraft is convenient and reliable in attitude adjustment during flight; and (2) the double-ring rotary wing spherical cabin aircraft greatly simplifies the transmission structure, lightens the weight, decreases the maintenance strength and cost, increases the power output radius, reduces requirements for the engine power, greatly decreases the energy consumption, has no need of empennage, and has a simple and optimized structure.

LIST OF REFERENCE NUMERALS

In the figures, 1: spherical cabin; 2: upper protective cover; 3: lower protective cover; 4: rotary wing fixing ring; 5: upper rotary wing rotor; 6: lower rotary wing rotor; 7: control system; 8: ventilating grill; 9: attitude-adjusting ring; 10: attitude-adjusting articulated shaft; 11: cabin articulated shaft; 12: attitude-adjusting motor; 13: moving ring; 14: strong magnetic rotor; 15: rotary wing blade; 16: excitation coil stator; 17: gyroscope; 18: mounting groove; 19: suspension ring; 20: adsorption ring; 21: movable permanent magnet ring; 22: fixed permanent magnet ring; 23: electromagnetic block; 24: displacement sensor; 25: protector ring; 26: anti-collision bearing; 27: reinforcement ring; 28: storage battery; 29: landing gear; 30: convex positioning ring; 31: closure ring; 32: rotor ring; 33: permanent magnetic shoe; 34: connecting trough; 35: stator ring; 36: excitation coil; 37: Hall sensor; 38: aluminum alloy induction ring; and 39: extension ring.

DETAILED DESCRIPTION OF THE PRESENT INVENTION

Technical solutions of the present invention will be further described below in detail by virtue of specific embodiments and in combination with drawings.

Embodiment 1: a double-ring rotary wing spherical cabin aircraft (see FIG. 1 to FIG. 6) includes a spherical cabin 1, an upper protective cover 2, a lower protective cover 3, a rotary wing fixing ring 4, an upper rotary wing rotor 5, a lower rotary wing rotor 6 and a control system 7; the upper protective cover, the lower protective cover, the upper rotary wing rotor and the lower rotary wing rotor are all circular; ventilating grills 8 are arranged on the upper protective cover and the lower protective cover; outer circles of the upper protective cover and the lower protective cover are connected together; the rotary wing fixing ring is connected between inner circles of the upper protective cover and the lower protective cover; an attitude-adjusting ring 9 is rotationally mounted on the rotary wing fixing ring; the spherical cabin is rotationally mounted in the attitude-adjusting ring; two attitude-adjusting articulated shafts 10 opposite to each other are connected between the attitude-adjusting ring and the rotary wing fixing ring; two cabin articulated shafts 11 opposite to each other are connected between the spherical cabin and the attitude-adjusting ring; axes of the attitude-adjusting articulated shafts are perpendicular to the axes of the cabin articulated shafts; one of the attitude-adjusting articulated shafts and one of the cabin articulated shafts are in transmission connection with attitude-adjusting motors 12; one attitude-adjusting motor is mounted on the spherical cabin, and the other attitude-adjusting motor is mounted on the rotary wing fixing ring. Each of the upper rotary wing rotor and the lower rotary wing rotor includes a moving ring 13, a strong magnetic rotor 14, and a plurality of rotary wing blades 15 connected to the moving ring in uniform distribution; excitation coil stators 16 are correspondingly mounted on the rotary wing fixing ring and the strong magnetic rotor; the moving ring is rotationally mounted on the rotary wing fixing ring; a gyroscope 17 is mounted on the rotary wing fixing ring; and the attitude-adjusting motors, the excitation coil stators and the gyroscope are all electrically connected with the control system. The rotation directions of the upper rotary wing rotor and the lower rotary wing rotor are always opposite. The outer ends of rotary wing blades on the same moving ring are connected into a whole by virtue of reinforcement rings 27. Through the arrangement of the reinforcement rings, the structural strength of the rotary wing blades is increased. The control system is powered by a storage battery 28, and both the storage battery and the control system are mounted in the spherical cabin. The lower end of the rotary wing fixing ring is connected with a plurality of landing gears 29 distributed uniformly. A convex positioning ring 30 is arranged at a position of the upper surface of the lower protective cover close to an outer edge; a closure ring 31 is arranged on the outer edge of the lower surface of the upper protective cover; the convex positioning ring and the closure ring are adaptively inserted together; and the lower end of the closure ring is supported on the upper surface of the lower protective cover. The strong magnetic rotor includes a rotor ring 32 and permanent magnetic shoes 33; a plurality of connecting troughs 34 are uniformly distributed on the rotor ring; one permanent magnetic shoe is mounted in each connecting trough; and inner surfaces of two adjacent permanent magnetic shoes have opposite magnetisms. The excitation coil stators include stator rings 35 and a plurality of excitation coils 36; each of the permanent magnetic shoes corresponds to one excitation coil; the excitation coils are mounted on the stator rings; a plurality of Hall sensors 37 are mounted on the stator rings and radially face the permanent magnetic shoes; and the Hall sensors and the excitation coils are electrically connected with the control system. An extension ring 39 extending downwards is arranged on the moving ring; and the strong magnetic rotor is connected to an inner wall of the lower end of the extension ring.

Figure 4:
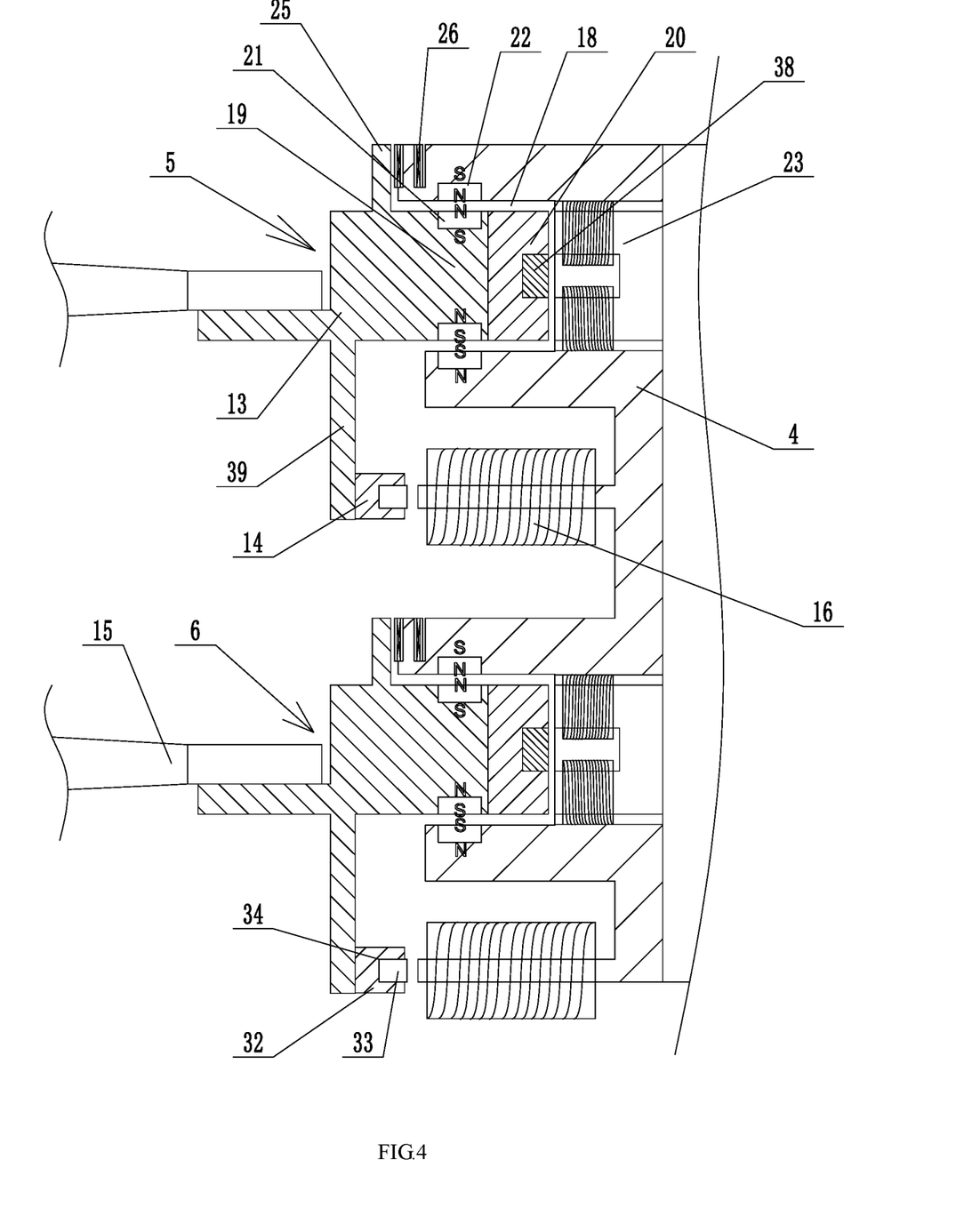
FIG. 4 is a partial section view of embodiment 1 of the present invention.
Figure 5:
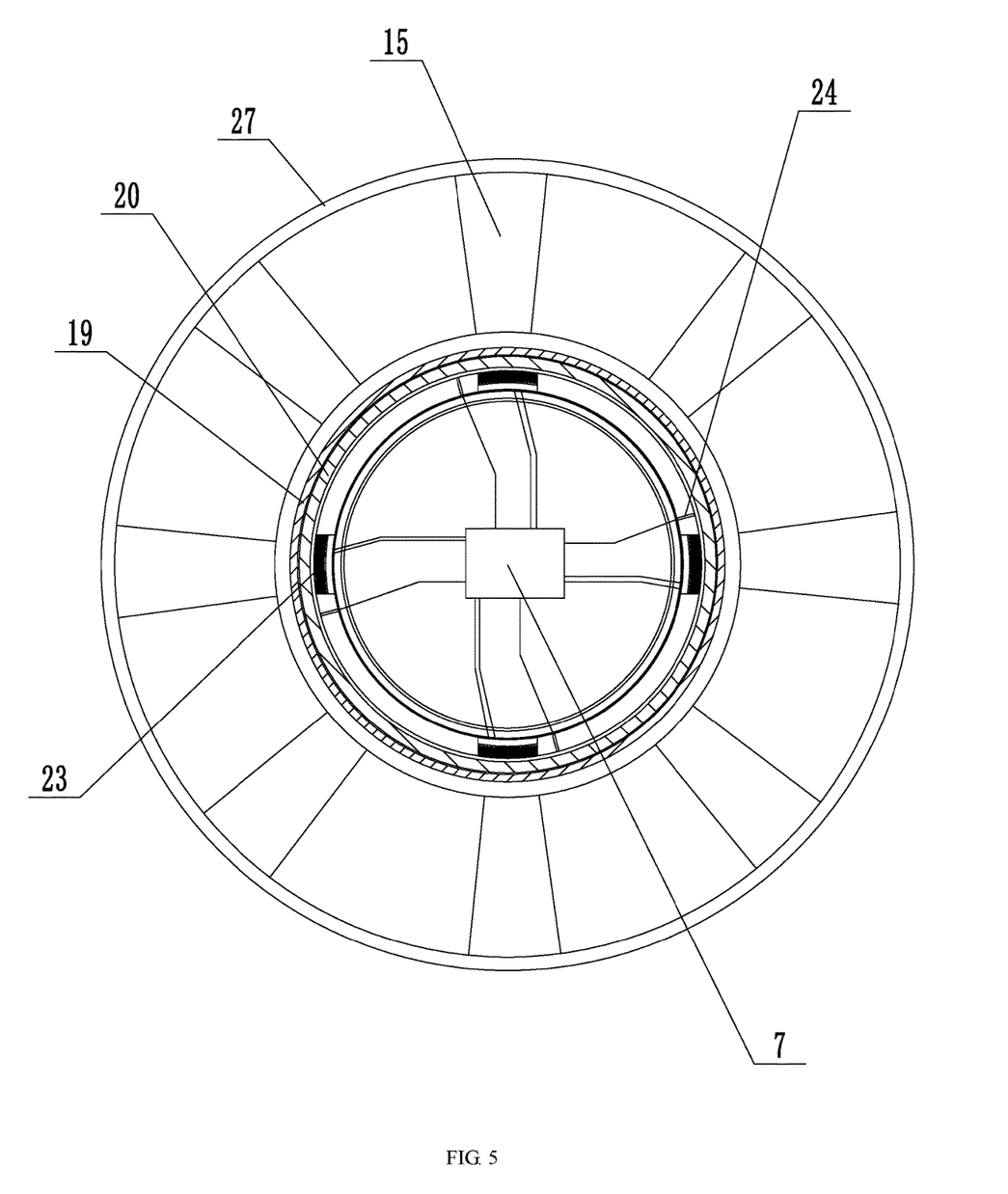
FIG. 5 is a suspension principle diagram of a suspension ring in embodiment 1 of the present invention.

Two circular mounting grooves 18 are formed in the rotary wing fixing ring; suspension rings 19 are arranged on the moving rings; adsorption rings 20 are mounted on inner walls of the suspension rings; the adsorption rings are iron rings; suspension gaps are formed among the suspension rings, the adsorption rings and side walls of the mounting grooves; movable permanent magnet rings 21 are mounted on upper and lower surfaces of the suspension rings; fixed permanent magnet rings 22 are mounted on the side walls of the mounting grooves and at corresponding positions of the movable permanent magnet rings; opposite sides of the movable permanent magnet rings and the fixed permanent magnet rings have the same magnetic pole; a plurality of electromagnetic blocks 23 are uniformly distributed and mounted on the rotary wing fixing ring; the electromagnetic blocks radially face the adsorption rings and may be electrified to attract the adsorption rings; displacement sensors 24 that radially face the adsorption rings are mounted at positions of the rotary wing fixing ring close to the electromagnetic blocks; and the electromagnetic blocks and the displacement sensors are electrically connected with the control system. Protector rings 25 are arranged on the upper surfaces of the moving rings; a plurality of anti-collision bearings 26 are uniformly distributed and mounted on the outer wall of the rotary wing fixing ring; totally eight anti-collision bearings are arranged in the present embodiment; anti-collision gaps are formed between outer walls of the anti-collision bearings and inner walls of the protector rings; and a radial spacing of the anti-collision gaps is smaller than a radial spacing between the inner walls of the adsorption rings and the side walls of the mounting grooves.

Mounting poles are correspondingly arranged on the rotary wing fixing ring and the anti-collision bearings; and inner races of the anti-collision bearings are tightly mounted on the mounting poles. Aluminum alloy induction rings 38 are mounted on inner walls of the adsorption rings; the displacement sensors radially face the aluminum alloy induction rings; and the displacement sensors are eddy current displacement sensors. Each electromagnetic block is of a U-shaped structure, and both ends of each electromagnetic block respectively face upper and lower sides of the aluminum alloy induction rings on the inner walls of the adsorption rings. Positioning grooves are formed in positions of the inner walls of the mounting grooves corresponding to fixed permanent magnet rings; and the fixed permanent magnet rings are tightly mounted in the positioning grooves. Tightening grooves are formed in positions of the suspension rings corresponding to movable permanent magnet rings; and the movable permanent magnet rings are tightly mounted in the tightening grooves.

Figure 1:
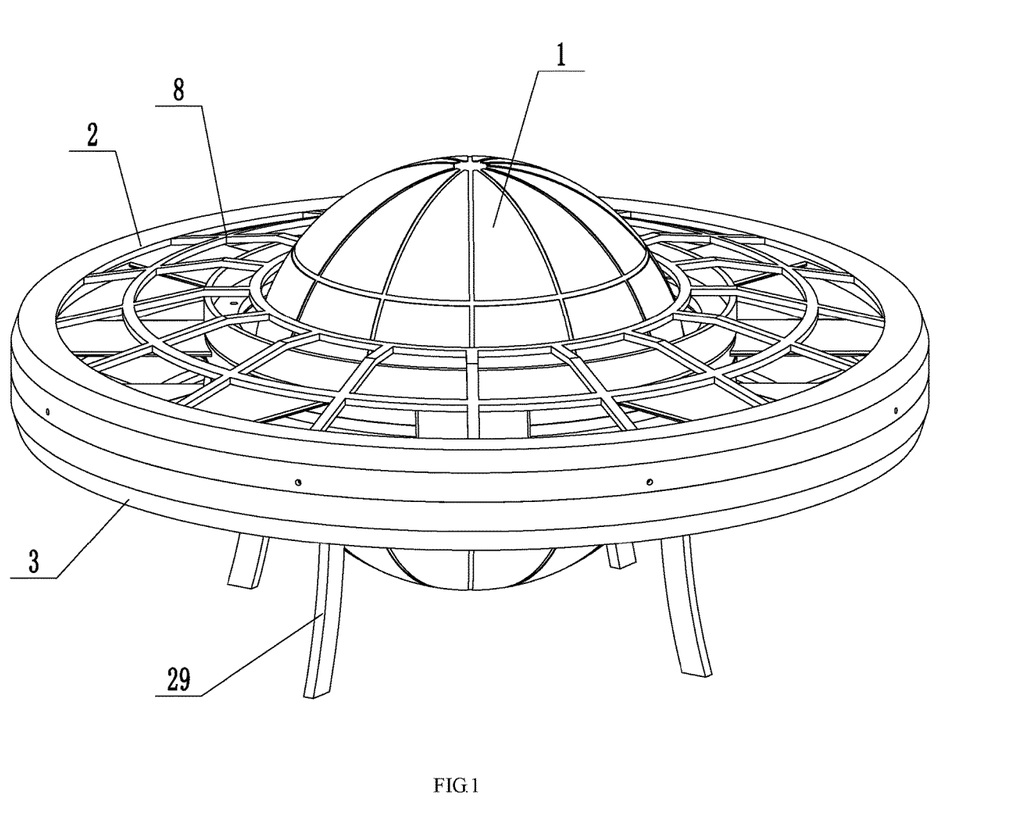
FIG. 1 is a structural schematic diagram of the present invention.
Figure 2:
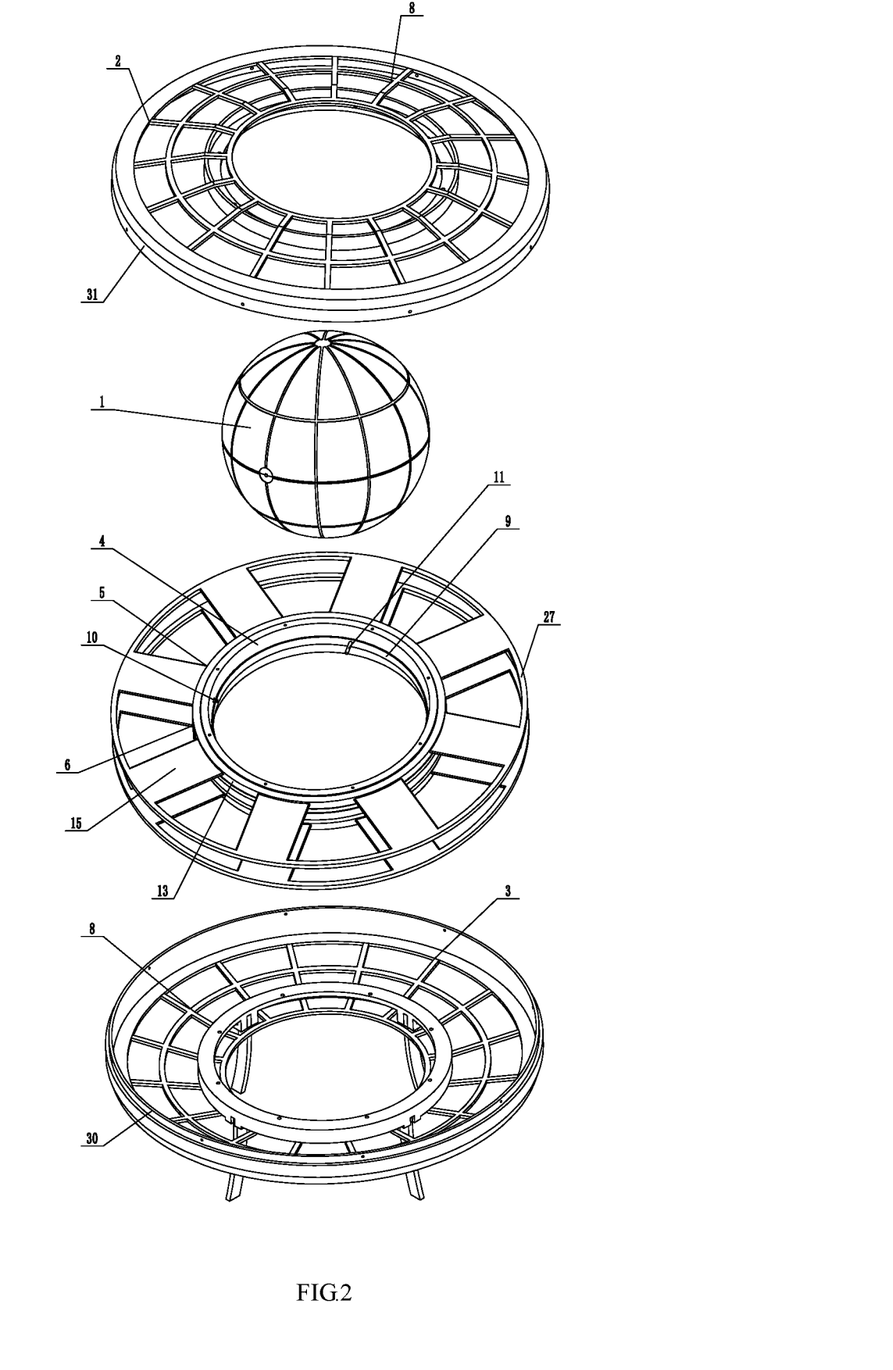
FIG. 2 is an explosive view of the present invention.
Figure 3:
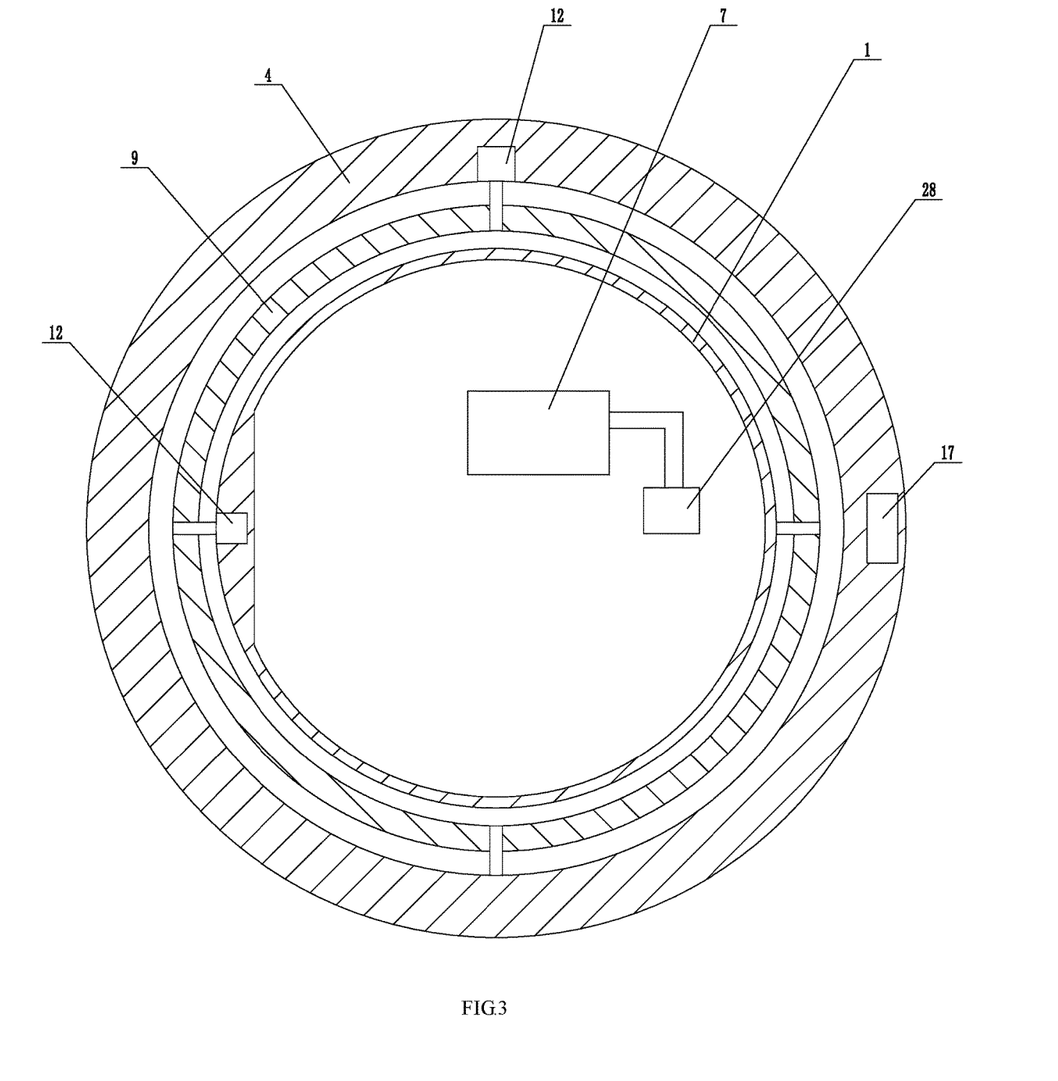
FIG. 3 is an attitude-adjusting principle diagram of the present invention.
Figure 6:
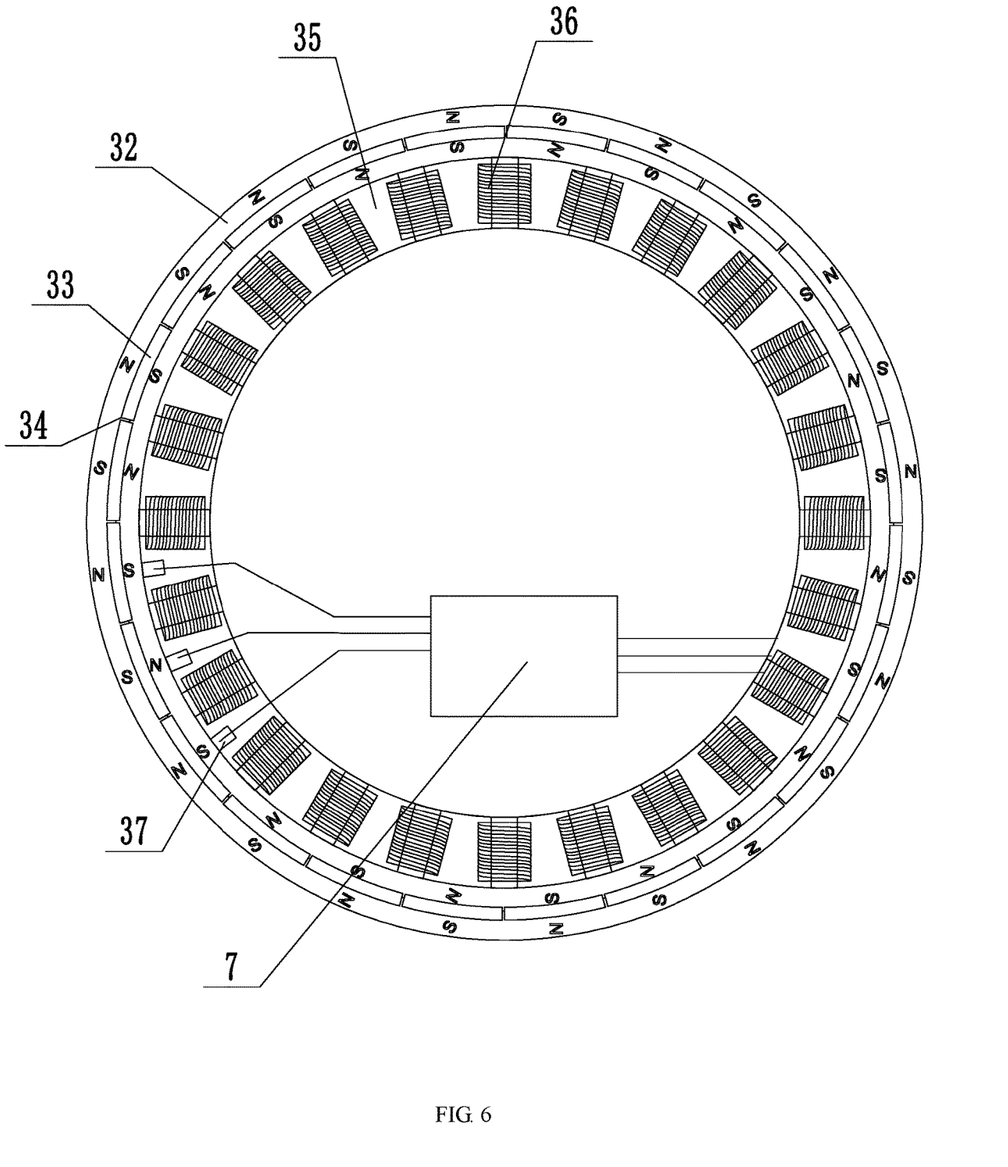
FIG. 6 is a principle diagram of a brushless direct current motor of the present invention.

The excitation coil stators and the strong magnetic rotor form a brushless direct current motor. During operation of the double-ring rotary wing spherical cabin aircraft, the excitation coil stators are electrified by the control system, and the strong magnetic rotor drives the moving ring to rotate together. The rotation directions of the upper rotary wing rotor and the lower rotary wing rotor are always opposite, and reaction torques produced by air offset with each other. When the rotation speed of one rotary wing rotor is changed, the direction of the aircraft may be changed. The center of the spherical cabin is close to a lower position, and the lower end of the spherical cabin is lower than the lower protective cover. Through the arrangement of a pair of attitude-adjusting articulated shafts and a pair of cabin articulated shafts, the spherical cabin and the rotary wing fixing ring can rotate at any angle. Operations of the two attitude-adjusting motors are controlled by the control system so as to rotate the attitude-adjusting articulated shafts and the cabin articulated shafts. Since a gravity center of the spherical cabin is always vertically downward, the rotary wing fixing ring forms a certain dip angle relative to the spherical cabin due to rotation of the attitude-adjusting articulated shafts and the cabin articulated shafts. The aircraft may obtain thrust in a horizontal direction, so that the aircraft can fly towards the dip angle direction. The gyroscope transmits detected dip angle signals and direction signals to the control system; and the control system issues instructions to the two attitude-adjusting motors according to the signals transmitted by the gyroscope so as to control rotation speeds and rotation angles of the attitude-adjusting motors. Both the upper rotary wing rotor and the lower rotary wing rotor are arranged between the upper protective cover and the lower protective cover. The rotary wing blades are hidden and may be not collided or broken during rotation. The upper rotary wing rotor and the lower rotary wing rotor are circular, and propeller blades are short, thereby facilitating reduction of harsh strength requirements for the propeller blades. The opposite sides of the movable permanent magnet rings and the fixed permanent magnet rings are in homopolar repulsion, so that the suspension rings are in a suspended state. Gaps are always maintained between the adsorption rings and the side walls of the mounting grooves to ensure that the moving ring is always kept in a suspended state during rotation. Electromagnetic block coils are electrified by the control system to enable the electromagnetic blocks to attract the adsorption rings; the displacement sensors transmit the detected signals to the control system; and the control system controls electrification of the electromagnetic block coils and electrification current according to the read signals of the displacement sensors. When the electromagnetic blocks are powered on or off in different periods of time, the electromagnetic blocks at maximum distance positions between the detected displacement sensors and the inner walls of the adsorption rings are electrified in the same period of time, so that the adsorption rings are attracted by the electromagnetic blocks, and the distances between the displacement sensors and the inner walls of the adsorption rings are shortened. The control system reads the signals of the displacement sensors and sets an electrification frequency of a single electromagnetic block according to needs, so that the suspension rings are always in dynamic equilibrium. When the upper rotary wing rotor and the lower rotary wing rotor rotate, the moving ring is always in a suspended state; vibration and noise are small, lubrication is not needed; mechanical wear is avoided; service life is long; and maintenance cost is low.

Embodiment 2: The structure of the double-ring rotary wing spherical cabin aircraft is similar to that in embodiment 1. A major difference is as follows: a rotating bearing is mounted between the rotary wing fixing ring and the moving ring in the present embodiment. The rotary wing fixing ring and the moving ring are rotationally connected by the rotating bearing, and the moving ring is stable and reliable in operation. Other structures are the same as those in embodiment 1.

The above embodiments are merely preferred solutions of the present invention, rather than a limitation of the present invention in any form. Other variations and modifications may be made on premise of not going beyond the technical solutions recorded in claims.

What is claimed is:

1. A double-ring rotary wing spherical cabin aircraft, comprising:
    a spherical cabin;
    an upper protective cover;
    a lower protective cover;
    a rotary wing fixing ring;
    an upper rotary wing rotor;
    a lower rotary wing rotor; and
    a control system;
    wherein the upper protective cover, the lower protective cover, the upper rotary wing rotor and the lower rotary wing rotor are all circular; ventilating grills are arranged on the upper protective cover and the lower protective cover; outer circles of the upper protective cover and the lower protective cover are connected together; the rotary wing fixing ring is connected between inner circles of the upper protective cover and the lower protective cover; an attitude-adjusting ring is rotationally mounted on the rotary wing fixing ring; the spherical cabin is rotationally mounted in the attitude-adjusting ring; two attitude-adjusting articulated shafts opposite to each other are connected between the attitude-adjusting ring and the rotary wing fixing ring; two cabin articulated shafts opposite to each other are connected between the spherical cabin and the attitude-adjusting ring; axes of the attitude-adjusting articulated shafts are perpendicular to the axes of the cabin articulated shafts; one of the attitude-adjusting articulated shafts and one of the cabin articulated shafts are in transmission connection with attitude-adjusting motors; each of the upper rotary wing rotor and the lower rotary wing rotor comprises a moving ring, a strong magnetic rotor, and a plurality of rotary wing blades connected to the moving ring in uniform distribution; excitation coil stators are correspondingly mounted on the rotary wing fixing ring and the strong magnetic rotor; the moving ring is rotationally mounted on the rotary wing fixing ring; a gyroscope is mounted on the rotary wing fixing ring; and the attitude-adjusting motor, the excitation coil stators and the gyroscope are all electrically connected with the control system.

2. The double-ring rotary wing spherical cabin aircraft according to claim 1, wherein two circular mounting grooves are formed in the rotary wing fixing ring; suspension rings are arranged on the moving rings; adsorption rings are mounted on inner walls of the suspension rings; suspension gaps are formed among the suspension rings, the adsorption rings and side walls of the mounting grooves; movable permanent magnet rings are mounted on upper and lower surfaces of the suspension rings; fixed permanent magnet rings are mounted on the side walls of the mounting grooves and at corresponding positions of the movable permanent magnet rings; opposite sides of the movable permanent magnet rings and the fixed permanent magnet rings have the same magnetic pole; a plurality of electromagnetic blocks are uniformly distributed and mounted on the rotary wing fixing ring; the electromagnetic blocks radially face the adsorption rings and may be electrified to attract the adsorption rings; displacement sensors that radially face the adsorption rings are mounted at positions of the rotary wing fixing ring close to the electromagnetic blocks; and the electromagnetic blocks and the displacement sensors are electrically connected with the control system.

3. The double-ring rotary wing spherical cabin aircraft according to claim 2, wherein protector rings are arranged on the upper surfaces of the moving rings; a plurality of anti-collision bearings are uniformly distributed and mounted on the outer wall of the rotary wing fixing ring; anti-collision gaps are formed between outer walls of the anti-collision bearings and inner walls of the protector rings; and a radial spacing of the anti-collision gaps is smaller than a radial spacing between the inner walls of the adsorption rings and the side walls of the mounting grooves.

4. The double-ring rotary wing spherical cabin aircraft according to claim 1, wherein a rotating bearing is mounted between the rotary wing fixing ring and the moving ring.

5. The double-ring rotary wing spherical cabin aircraft according to claim 1, wherein the control system is powered by a storage battery, and both the storage battery and the control system are mounted in the spherical cabin.

6. The double-ring rotary wing spherical cabin aircraft according to claim 1, wherein the lower end of the rotary wing fixing ring is connected with a plurality of landing gears distributed uniformly.

7. The double-ring rotary wing spherical cabin aircraft according to claim 1, wherein a convex positioning ring is arranged at a position of the upper surface of the lower protective cover close to an outer edge; a closure ring is arranged on the outer edge of the lower surface of the upper protective cover; the convex positioning ring and the closure ring are adaptively inserted together; and the lower end of the closure ring is supported on the upper surface of the lower protective cover.

8. The double-ring rotary wing spherical cabin aircraft according to claim 1, wherein the strong magnetic rotor comprises a rotor ring and permanent magnetic shoes; a plurality of connecting troughs are uniformly distributed on the rotor ring; one permanent magnetic shoe is mounted in each connecting trough; and inner surfaces of two adjacent permanent magnetic shoes have opposite magnetisms.

9. The double-ring rotary wing spherical cabin aircraft according to claim 8, wherein the excitation coil stators comprise stator rings and a plurality of excitation coils; each of the permanent magnetic shoes corresponds to one excitation coil; the excitation coils are mounted on the stator rings; a plurality of Hall sensors are mounted on the stator rings and radially face the permanent magnetic shoes; and the Hall sensors and the excitation coils are electrically connected with the control system.

* * * * *